United States Patent [19]

Eastman et al.

[11] Patent Number: 5,786,585
[45] Date of Patent: Jul. 28, 1998

[54] OPTICAL SYMBOL (BAR CODE) READING SYSTEMS AND DEVICES

[75] Inventors: Jay M. Eastman; James M. Zavislan, both of Pittsford, N.Y.

[73] Assignee: PSC, Inc., Webster, N.Y.

[21] Appl. No.: 375,216

[22] Filed: Jan. 19, 1995

Related U.S. Application Data

[63] Continuation of Ser. No. 985,371, Dec. 4, 1992, abandoned.

[51] Int. Cl.[6] .................................................. G06K 7/10
[52] U.S. Cl. ............................................. 235/472; 235/462
[58] Field of Search ............................ 235/454, 456, 235/462, 467, 472, 470, 473; 385/31, 37; 359/575; 358/484

[56] References Cited

U.S. PATENT DOCUMENTS

| | | | |
|---|---|---|---|
| 3,739,095 | 6/1973 | Alden | 358/484 |
| 4,402,017 | 8/1983 | Takei | 358/484 |
| 4,559,564 | 12/1985 | Itoh et al. | 358/484 |
| 4,578,571 | 3/1986 | Williams | 235/472 |
| 4,672,187 | 6/1987 | Fujita et al. | 250/201 |
| 4,805,175 | 2/1989 | Knowles | 372/24 |
| 4,897,532 | 1/1990 | Swartz et al. | 235/467 |
| 4,945,527 | 7/1990 | Sunagawa | 385/37 |
| 4,983,818 | 1/1991 | Knowles | 235/472 |
| 5,010,241 | 4/1991 | Butterworth | 235/477 |
| 5,013,133 | 5/1991 | Buralli et al. | |
| 5,015,831 | 5/1991 | Eastman | 235/462 |
| 5,059,778 | 10/1991 | Zouzoulas | 235/472 |
| 5,115,120 | 5/1992 | Eastman | 235/462 |
| 5,123,064 | 6/1992 | Hacker et al. | 382/59 |
| 5,144,120 | 9/1992 | Krichever et al. | 235/472 |
| 5,200,597 | 4/1993 | Eastman et al. | 235/467 |
| 5,204,516 | 4/1993 | Opheij | 385/37 |
| 5,216,233 | 6/1993 | Main et al. | 235/472 |
| 5,266,788 | 11/1993 | Yamazaki et al. | 235/473 |
| 5,268,985 | 12/1993 | Ando et al. | 385/37 |

FOREIGN PATENT DOCUMENTS

| | | | |
|---|---|---|---|
| 3536497 | 4/1986 | Germany | 385/37 |
| 53-98733 | 8/1978 | Japan | 235/472 |
| 58-192183 | 11/1983 | Japan | 382/59 |
| 2-054203 | 2/1990 | Japan | 385/31 |
| 2-264383 | 10/1990 | Japan | 235/472 |
| 4-151784 | 5/1992 | Japan | 235/467 |
| 90/16033 | 12/1990 | WIPO . | |
| 92/16909 | 10/1992 | WIPO | 235/473 |

OTHER PUBLICATIONS

Mitsui–Pathtek Corporation, Product Capabilities Using In–Mold Circuit Definition (3 sheets), Jun., 1990.

*Primary Examiner*—Donald T. Hajec
*Assistant Examiner*—Karl Frech
*Attorney, Agent, or Firm*—Foley & Lardner

[57] ABSTRACT

A miniature scan engine module for bar code reading and data collection systems utilizes a light source 44 and a light collector 42, which in one embodiment, are flexurally supported on a platform 62 which reciprocates 88 on pivots defined by flexures 46, 48 or 96. The optical collector faces the bar code and pivots with the scanning beam source (a laser diode). A diffraction grating or Fresnel lens on the surface of the optical collector which faces the code directs the incoming light so that it propagates internally in a substrate within the body of the collector, i.e. in the optic itself and without air paths which require additional volume in the module, to a photodetector. The scan engine can be configured so that it occupies a volume of less than 1 cubic inch. A data collection system, in the form of a portable terminal 10, has a housing which provides the handle 12 of a scanning accessory. The housing of the accessory has a receptacle for a terminal unit 14 which is separable from the accessory's housing.

51 Claims, 12 Drawing Sheets

OPTICAL SYMBOL (BAR CODE) READING SYSTEMS AND DEVICES

This is a continuation of application Ser. No. 07/985,371, filed Dec. 4, 1992, now abandoned.

The present invention relates to scan engines or modules for scanning a light beam across an optically readable data representing symbol, such as a bar code, and receiving light from the symbol upon illumination by the beam to provide signals representing the symbol and also to an improved optic for the collecting of the light received from the symbol which facilitates the miniaturization of such modules.

The invention also relates to data collection systems and especially to portable terminals (sometimes called portable transaction terminals) having a terminal unit and a scanning accessory in a handle, which releasably holds the terminal unit and which contains a symbol reader operable independently or with the terminal unit for providing signals corresponding to the data represented by the symbol to the terminal unit for processing and/or storage therein. The terminal unit is useable separately or in integrated assembly with the bar code reading handle portion (the scanning accessory).

The miniature scan engines or modules, such as provided in accordance with the invention when integrated in a portable terminal, as in the limited space provided in a manually graspable handle enables the integrated terminal to be reduced in size so as to make it easier to carry and operate, thereby providing an improved, portable data collection system capable of bar code reading. A scan engine provided by the invention may occupy a volume of less than 1 cubic inch in a generally rectangular package of about 1 inch by 1 and ¼ inch in width and length and about ⁹⁄₁₀ of an inch in height or thickness. The received light collection optic provided by the invention is useful generally in collection of light in a field of view and especially where miniaturization or design simplification, for example, of scan engines, is desired. The term scan engine and module, as used herein, may be taken to mean a unitary assembly of a light beam source, a beam deflector and optical and electronic components for collection and translating light received from a symbol (e.g. a bar code) into data representing electrical signals.

As smaller light sources, particularly semi-conductor lasers, capable of developing high illumination intensity levels have become available, bar code scanning devices have been reduced in size. An avenue for size reduction has been in the manner in which the light source and associated photo detectors are mounted. U.S. Pat. Nos. 5,015,831 issued to Eastman et al., on May 14, 1991 and Eastman U.S. Pat. No. 5,115,120 issued May 19, 1992, illustrate scan engines using flexural mounts. Such mounts facilitate miniaturization of a scan engine by enabling the laser diode and associated photodetector to be mounted on a support which can be reciprocally oscillated to scan the light beam across a bar code symbol.

Another factor which has limited miniaturization is the need to collect sufficient light from the code upon illumination thereof by the scanning beam to enable a photodetector to transduce the light into an electrical signal containing the data represented by the bar code. To meet these goals it has been proposed to use detectors or detector arrays of as wide an area as possible, collecting lenses for focusing the incoming illumination on the detector or to utilize collection mirrors. Air paths among and between lenses, mirrors and the detector, over which light must propagate, requires space and limits miniaturization. Further progress toward miniaturization has been limited, because the light collected by lens and/or mirror systems of scaled down size, becomes insufficient for reliable and accurate translation into data representing electrical signals. It is a feature of this invention to provide an improved light collection optic which remove such limitations thereby enabling still further miniaturization of scan engines or modules, and also to provide improved scan engines incorporating such light collection optics.

Data collection systems incorporating bar code scanners as a means for collecting data for processing or storage are widely used for inventory and stock management, as well as point of sales data collection. These systems, sometimes called data collection or transaction terminals, may be used by themselves to independently collect the data and even process it. Such independent terminals may be miniature in size, limited only by the size of the display which is desired and the area desired for the keys of the keypad or keyboard thereof; the computerized data storage and collection facilities and batteries requiring only limited space. Bar code readers may also be used by themselves and connected by cables or radio links to separate or remote terminals. Also, it is desirable at times to utilize a remote terminal or a cash register terminal, to which the bar code reader may be linked, or to combine the reader with the portable terminal. The size of the bar code reading device has been a limitation upon the overall size and volume of an integrated bar code reading and data collection assembly (i.e., the portable transaction terminal). Furthermore, it is desirable that the scanner portion (the scanning accessory) of the portable terminal, rather than the data collection portion, be provided in or as part of the handle by which the terminal can be grasped. Then, if the terminal is disconnected, the scanner portion is readily useful as a stand-alone bar code scanning reader. A portable transaction terminal where the data collection unit acts as the handle when assembled with a scan engine unit is found in the above referenced U.S. Pat. No. 5,115,120.

It is a feature of the present invention to enable the bar code reading scanner to be incorporated into a handle, or a scanning accessory, which may be integrated with data collection processing unit to provide a portable terminal, if and when portable terminal operation is desired. If only bar code scanning is needed, the collection and processing unit is detached and the handle portion used as a bar code scanner. The use of a miniature bar code scan engine module in accordance with this invention facilitates the incorporation thereof into the handle portion which can be detachably connected in supporting relationship with (e.g. as a receptacle for) a data collection and processing unit to provide a miniature portable transaction terminal.

Accordingly, objects of the invention include any or all of the following:

(a) to provide improved optics for collecting light from data representing optical symbols (bar codes) effectively and efficiently while minimizing the physical space (volume) required for the light collection function;

(b) to provide improved devices for reading such optical symbols including scan engines and modules which incorporate such improved light collection optics and thereby may be miniaturized;

(c) to provide improved transaction terminals for data collection with optical symbol (bar code) reading capabilities, which can be miniaturized, and to also can provide the optical symbol reading facilities in a handle of the terminal which can be detached for the terminal so that it and the other parts of the terminal (as for data entry and processing and storage) may be used separately; and (d) to provide an improved system for reading optical symbols or codes which are arranged along plural coordinates (e.g. two dimensional bar codes).

The foregoing objects of the invention stated more specifically are as follows:

(a) to provide improved devices for reading optically scannable symbols, such as bar codes, which devices may be used in a portable terminal or wherever a miniature bar code scanner is needed or where the space allocated for bar code scanning facilities is limited;

(b) to provide improved devices having bar code scanning and reading portions and data collection and processing portions which may be incorporated, as scanning accessories, in integrated assemblies, suitable for use as portable transaction terminals, but which bar code scanning portions and data collection and processing units may be separated and used separately if desired;

(c) to provide improved bar code scan engine modules which utilize optical collection means which facilitate the miniaturization of such scan engine modules;

(d) to provide improved hand held bar code scanning units which are connectable in supporting relationship to data collection and processing units to provide improved, and portable data collection and/or terminals, which may be miniaturized.

Briefly described, the invention provides a scanning accessory which may be used with (or separately from a terminal unit to provide a portable data collection or transaction terminal system for collecting and entering data both manually and by optically reading data representing symbols, which embodies the invention. The terminal unit has a data entry device which may be a keyboard for manual data entry, a display and computerized data processing and storage components. This unit is contained in a first housing. The scanning accessory is in a second housing which provides a handle which supports and is electrically connectable (via a wire) to the data entry unit. In the handle there is contained a miniature scan terminal engine having means for projecting a light beam outwardly therefrom and through a window in the handle towards optically readable symbols. The scan engine module also contains an electro-optical receptor and a semi-conductor laser or other light source. Preferably, the source, the receptor, which may include an optic which collects the light, and associated components are mounted on a flexurally supported plate together with drive means (preferably electromagnetic in operation) which drive the support, the source and the receptor to execute oscillatory motion thereby scanning the beam across the symbol. The receptor is preferably provided by an optical collector having an optic provided by a body into which light is coupled and directed toward a side of the body to an optoelectric transducer in the immediate vicinity thereof. The body may be in the form of a plate which faces in the same direction as the scanning beam. An electro optical transducer or photodetector, such as a photodiode, a photodiode array or a charge coupled device, CCD, is mounted along one end of the plate. In order to couple light into the plate and direct the light at such angles to provide propagation towards the photodetector, a diffraction grating or Fresnel refractive lens is formed in or adjacent to one surface of the plate. The area of the surface may be equal to the area of the scan engine module (the plate being of length and width equal to the length and width of the scan engine). The scan engine may be much smaller than the smallest length or width dimension in its thickness. Accordingly, the scan engine may be miniaturized so as to occupy an area less than 1 cubic inch, for example with a width and length of less than 1.25×1.1 inch and a thickness less than 0.6 inch.

The light collector optics of the receptor may be embodied in various forms using gratings, grating lenses, reflectors, and multi-layer optical light guides which are operative to capture the light incident thereon, thereby avoiding external air paths for light propagation and facilitating miniaturization and simplification of scan engines which also may be embodied in various forms, all within the scope of the invention. A scan engine provided in accordance with this invention may use the scanning beam and the receptor to scan code elements of a two dimensional code, respectively in each dimension of the code.

The scan engine module facilitates the disposition of the scanning function of the terminal in the detachable handle, as well as facilitating design of other miniaturized bar code reading or scanning devices which may be attached to the back of the hand of an operator, in his or her helmet, as in copending U.S. patent applications Ser. Nos. 07/756,636, filed Sep. 9, 1991 in the name of Quick et al now U.S. Pat. Nos. 5,212,372, issued May 18, 1993; and 07/756,637 filed Sep. 9, 1991 in the name of Eastman et al, now U.S. Patent No. 5,208,449 issued May 4, 1993 both assigned to the same assignee as this application, or elsewhere where space is limited.

The foregoing and other features, objects and advantages of the invention as well as presently preferred embodiments thereof will become more apparent from a reading of the following description in connection with the accompany drawings in which:

FIG. 1 is an elevational side view, partially in section, of a portable terminal having bar code scanning facilities in the handle thereof; the handle supporting and being connected to a manual data entry and data processing unit; the terminal being shown as an integrated assembly, but the handle with its bar code scanning facilities and the manual entry and processing unit being separable and useable independently of each other;

Figure 15:
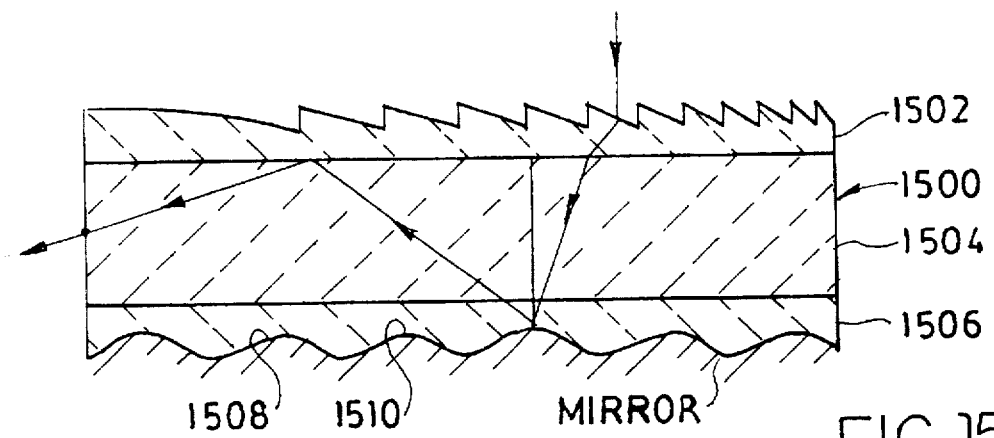
Figure 16:
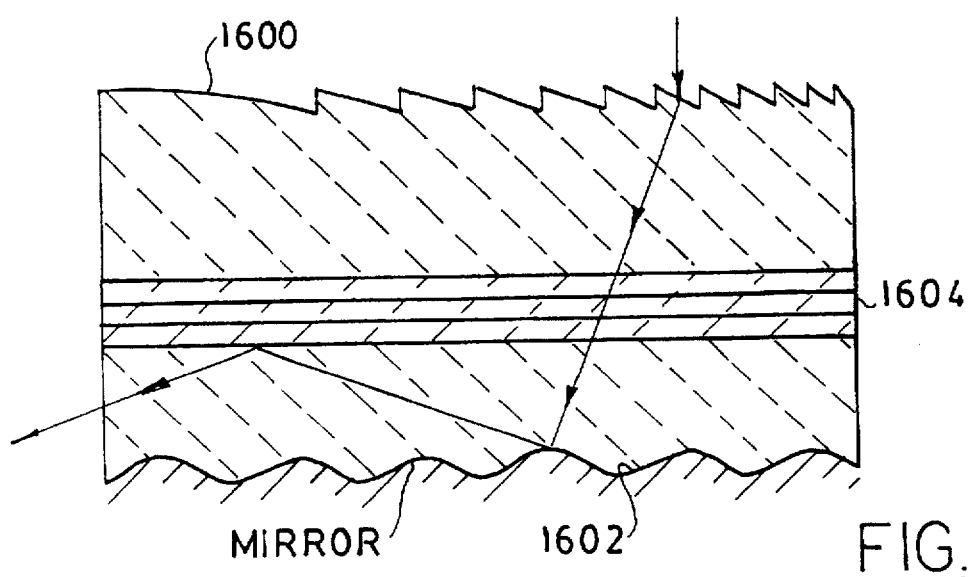
Figure 17:
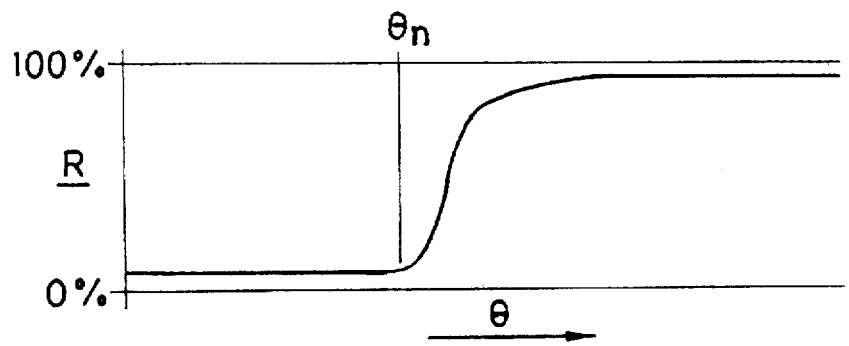
Figure 28A:
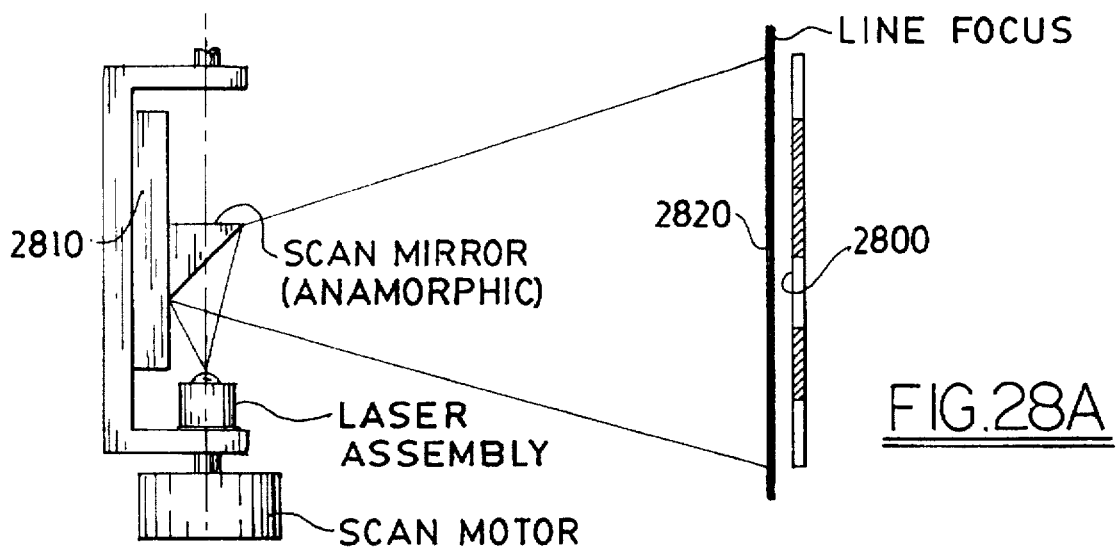
Figure 28B:
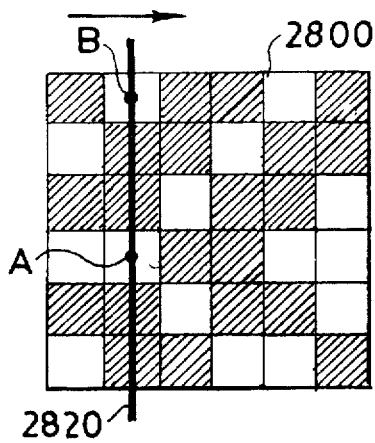

FIGS. 8–23 a diagrammatic views of optical collectors showing different inventive embodiments and which comprise optical receptors and FIG. 17 being a plot of the reflectance characteristic of the embodiment of FIG. 16;

FIGS. 24–27 are diagrammatic view showing different embodiments of scan engines in accordance with the invention and which incorporate a light receptor of the type shown in FIGS. 8–23;

FIG. 28a is diagrammatic elevational view of a scan engine for scanning and reading two dimensional (2-D) bar codes;

FIG. 28b is a side view of an exemplary 2-D code; and

Figure 29A:
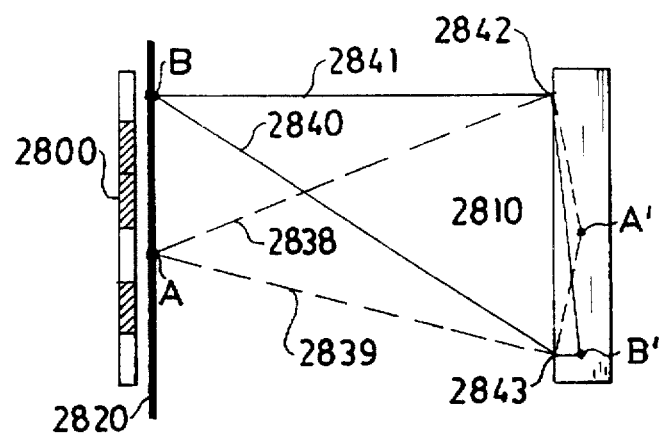

FIG. 29a & b are diagrammatic side and plan views showing operation of the receptor of the engine of FIGS. 28 a & b and its associated detector.

Figure 1:
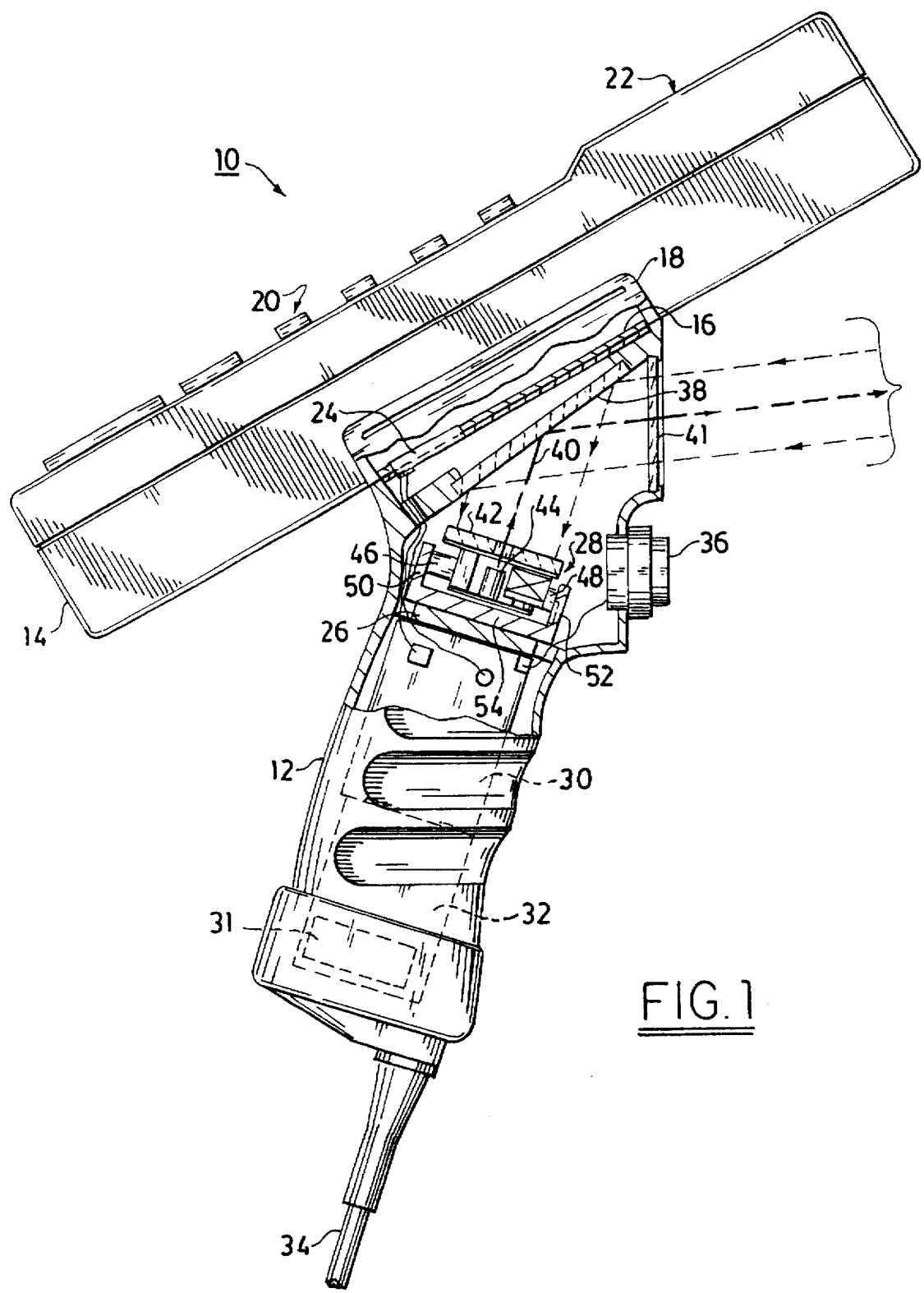
Figure 2:
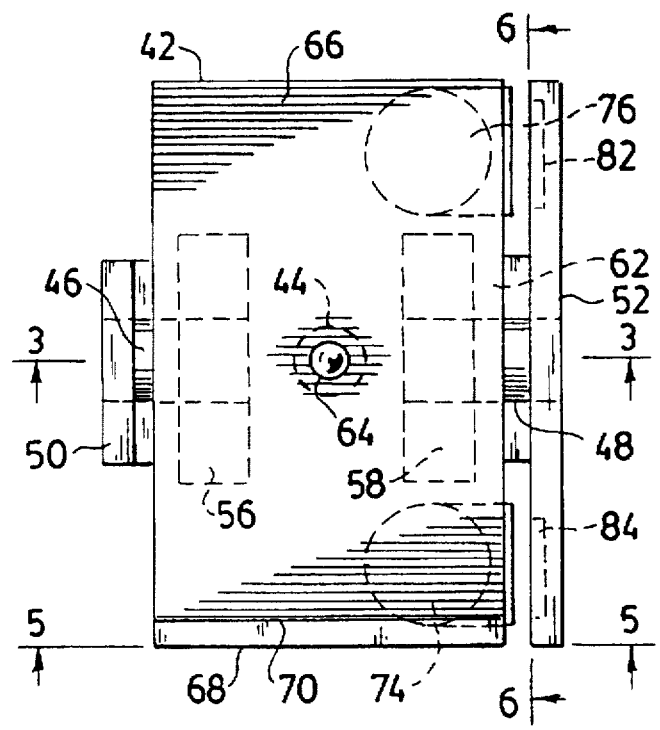
FIG. 2 is a plan view of the scan engine module shown in FIG. 1.
Figure 3:
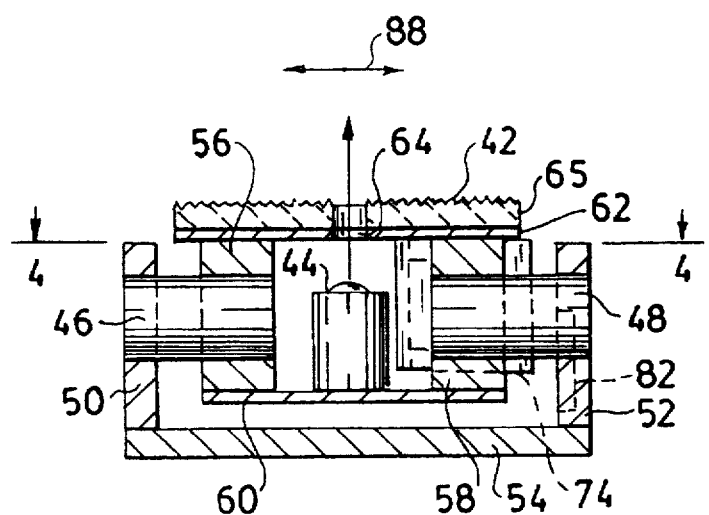
FIG. 3 is a sectional view taken along the line 3—3 in FIG. 2.
Figure 4:
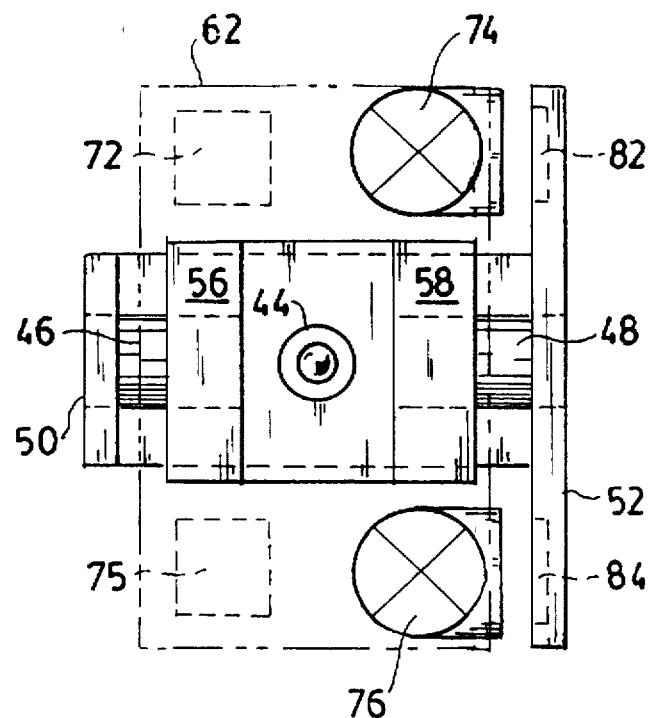
FIG. 4 is a view of the scan engine module with the optical receptor, its light collector and its support removed to show the components there below, the view being taken generally along the line 4—4 in FIG. 3.
Figure 5:
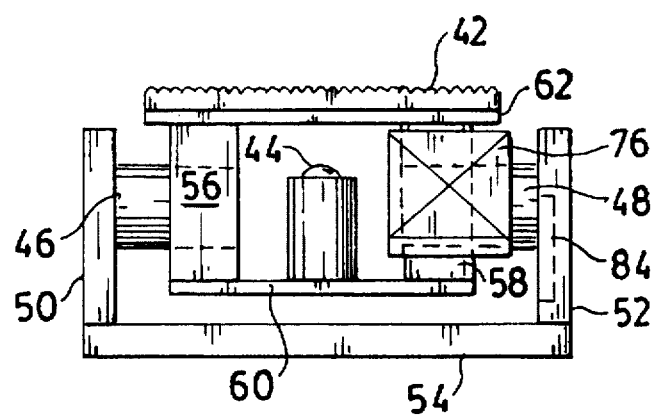
FIG. 5 is an end view taken along the line 5—5 in FIG. 2.
Figure 6:
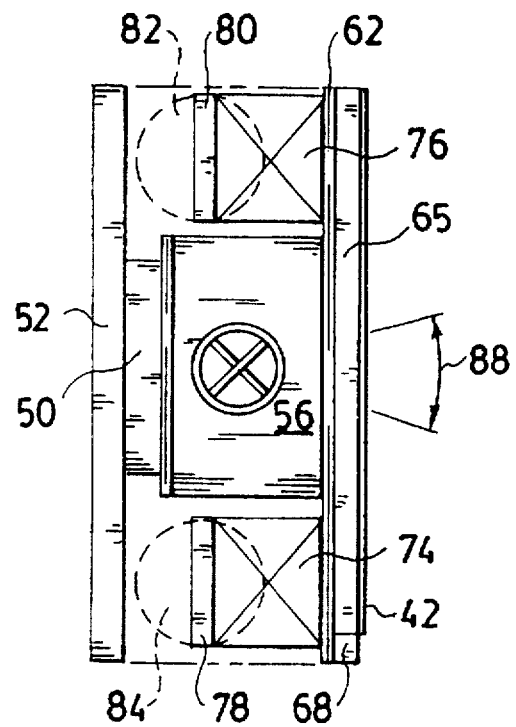
FIG. 6 is a side view taken along the line 6—6 in FIG. 2.

Referring to FIG. 1, there is shown a portable transaction terminal 10 having a bar code scanning reader handle 12 (a scanner accessory) and a data entry, processing and display terminal unit 14 which are separable, but are shown assembled together at an interface 16 in a saddle or receptacle 18 at the top of the handle 12. The terminal has a keyboard 20 and a display 22 on one surface of the housing of the terminal. The bottom of the housing has one half of a connector 24 while the top or saddle, which defines the interface 16, has the other part of the connector 24. This connector may be provided by techniques for molding interconnections wherein resins capable of being treated so as to accept conductive material by plating or electrodeposition are used. The interface may have such plated connections which define the connectors 24 as well as conductive leads to the electronic circuits in the terminal unit 14 and in the handle 12. Techniques for forming such circuits are offered by Mitsui-Pathtek Corporation, 25 Metro Park, Rochester, N.Y. 14623. Alternatively, the connections may be provided by optical links; e.g., optos such as light emitters (LEDS) & photo detectors on opposite side s of the interface 16

Contained in the handle on a bracket 26 is miniaturized scan engine module 28. Below the bracket 26 is a circuit board 30 and another module 31 and a battery 32. The battery is optional, if power for operating the scan engine is provided from batteries in the terminal unit 14 or from an external terminal, which is not shown, which is connected to the handle 12 by way of a cable 34. This cable has leads for signals which are obtained in response to light detected from bar codes which are scanned by the engine 28. Leads from the circuit board 30 also are connected to the external terminal via the cable 34. The signal carrying leads to the terminal unit 14 and in the signal cable 34 may be connected in parallel, or circuitry on the board 30 may be operative to disconnect the signal carrying leads to the cable 34, when the terminal unit 14 is assembled and connected to the handle 12. The handle 12 also has a trigger 36 which operates a switch connected to the circuit board for enabling power to be applied to the laser diode and to the drive mechanism of the scan engine which causes the light beam from the scan engine to scan across the code.

The top end of the handle has brackets which house a folding mirror 38. This mirror directs the scanning beam 40 through a window or port 41 in the handle 12 in the direction of the code. It also reflects illumination from the code in response to this scanning beam to an optical receptor, which includes a light collector 42 of the scan engine module 28. This collector and the semiconductor laser (laser diode 44) are mounted for conjoint oscillatory movement in flexures 46 and 48 which define a pivotal axis between foot members 50 and 52 extending from the base of a support 54 which is fixedly and stationarily mounted on the bracket 26. The scan engine, thus, provides a laser light beam 40 which scans the code and translates the illumination received upon scanning from the code into signals representing the code which are then processed in circuitry on the circuit board 30 and forwarded to the terminal unit 14 or to another external terminal or other bar code signal utilization device which is connected to the handle by the cable 34. The circuitry on circuit board 30 may produce signals to initiate scanning by the scan engine module and to terminate scanning when a symbol is decoded or a period of time has elapsed. This circuitry may be of the type discussed in application Ser. No. 07/652,158 filed Feb. 7, 1991 in the name of Eastman et al now U.S. Pat. No. 5,200,597 issued Oct. 7, 1992 or Ser. No. 07/710,839 filed Jun. 5, 1991 and Ser. No. 07/786,147 filed Oct. 31, 1991 in the name of Grodevant, all assigned to the same assignee as this application, now U.S. Pat. Nos. 5,260,554, issued Nov. 9, 1993 and 5,237,839, issued Aug. 17, 1993.

Both the terminal unit 14 and the handle bar code scanner may be used separately, if desired. When interconnected as shown in FIG. 1 they provide an integrated portable transaction terminal which the operator can hold in one hand by the handle and enter data with the other hand on the keyboard 20. This data is processed in the computerized data handling circuitry of the terminal unit 14. The data may be held in memory in the terminal unit 14 for later read out and/or displayed on the display 22. The terminal unit may also contain a transmitter and receiver to communicate data to and from a host computer via a wire or wireless link. Other facilities such as good read signals (audible or visual) may be provided. The handle unit may also be self-contained and have a display on which the bar codes which are read or messages from a host computer are shown.

The scan engine 28 which is shown in FIG. 1 and in greater detail in FIGS. 2 through 6 is of the type presently preferred for use in the portable transaction terminal 10. The light receptor/collector 42 may be of the types shown in FIGS. 8–23. The engine 28 itself may be a miniature scan engine of other types than shown in FIGS. 1–7, for example, it may be of the type provided in accordance with the invention and shown in FIGS. 24–27. If two dimensional bar codes are to be scanned and read, the engine may be of the type shown in FIGS. 28 & 29.

In the scan engine illustrated in FIGS. 1–7, the flexures 46 and 48 may be of the type shown in the above-referenced U.S. Pat. 5,015,831. They include members which provide circuit paths or traces of conductive material carrying signals from the photoreceptor 42 as well as lines to the laser diode 44 (plus 5 volts and ground) which apply power to the laser diode. These circuit path members may, when the flexures are plastic, be molded in strips of plated conductive material integral with the flexures using manufacturing techniques as discussed above.

A support for the laser diode 44 and the receptor 42 is provided by support blocks 56 and 58. These support blocks are connected to the flexures 46 and 48 along one side thereof and also to lower and upper circuit boards 60 and 62. The lower circuit board 60, which may be a planar board, as illustrated, or a formed molded, plated conductive material, carries the laser diode 44 and its control, power and ground signals to circuit paths in the flexures either directly or via circuit board 62. These circuit paths may be in either or both of the flexures 46 and 48. The upper circuit board 62 supports the optical collector (part of the electro-optical receptor 42). There may be an optical via, such as a hole 64, in the upper board 62 through which the beam 40 from the laser diode 44 projects on its way to the folding mirror 38 and thence to the code (See FIG. 1). There may also be a hole in the optical collector in alignment with the hole 64. The collector, which is a transparent thin glass or plastic plate 65 having a grating 66, the plate providing the substrate for the grating 66, as well as a light guide. Another type of optical via may be provided by a section of the plate 66 where the grating lines may be removed. This area is an area in alignment with the beam and through which the beam 40 passes. This light guide may be provided by layers of high and low index of refraction glass or plastic, as is discussed in greater detail in connection with FIG. 15.

The grating 66 may be a blazed grating or may be a transmission grating of the holographic type wherein the lines are internal, but preferably near the outer surface (which faces away from the scan module and in the direction of the beam 40).

At one end of the plate 65 is a photodetector 68. This may be a single junction photodetector (a long photodiode) where the junction extends along the end 70 of the plate 65. The photodetector may be a phototransistor, or an array of adjacent photodiodes or phototransistors disposed to receive light leaving the end 70 of the substrate plate 65, or a charge coupled device (CCD). The grating lines (which may be straight or curved) are essentially parallel to the end 70.

Briefly, the collector may operate as follows. The grating diffracts incoming light; the first order diffraction component being at such angles to the surfaces of the plate 65 that light guide propagating modes occur in the substrate plate 65. Light propagating through the plate 65 reaches the end 70 and is transduced by the photodetector 68 into electrical signals representing the code. These signals may be processed and/or detected by integrated circuits (ICs) 72 and 75 which are mounted on the upper board 62.

In order to reciprocally oscillate the board about the axis defined by the flexures 46 and 48, there are provided an electromagnetic driver having coils 74 and 76 depending from the upper board 62. Pole pieces 78 and 80 concentrate the electromagnetic field and provide attraction or repulsion to permanent magnets 82 and 84 which are in electromagnetically coupled relationship with the coils. When one coil attracts the other repels so as to drive the support including the laser diode 44 and the receptor 42 with an oscillatory motion as indicated by the arrows 88. This motion causes the scan beam 40 to scan across the code. Connections are provided in the board 62 from the circuits 72 and 75. These circuits have components which switch current to the coils 74 and 76 to cause the oscillation of the laser diode 44 and the receptor 42 about the pivotal axis defined by the flexures 46 and 48. The receptor 42 oscillates conjointly (together) with the laser diode since they are tied together by a common support structure. Thus, as the beam scans the code, illumination is received which is translated into signals containing the data represented by the code.

Figure 7:
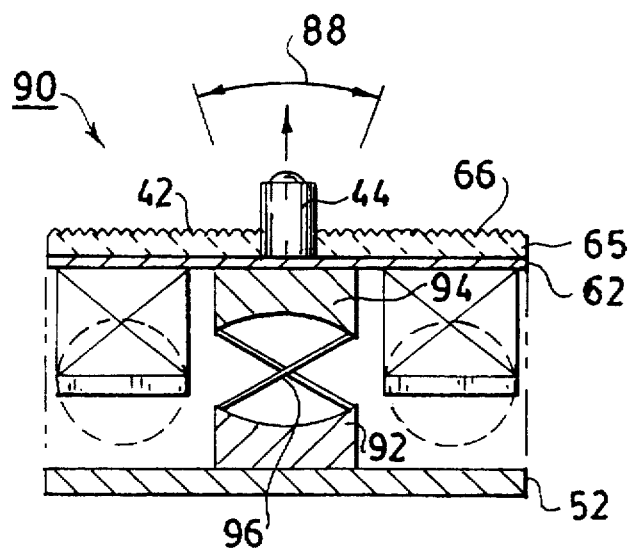
FIG. 7 is a view similar to FIG. 6 with a flexural support of design different than that used in the scan engine module of FIGS. 1 through 6.

Referring to FIG. 7 there is shown a scan engine module 90 which is similar in many respects to the scan engine module 28, and like parts are identified by like reference numerals. The receptor 42 is shown without its photodetector 68. Only one circuit board 62 is used. The laser diode is mounted on the board through an opening in the substrate 65 and its grating. The flexures are provided by crossed springs of a design similar to those discussed in the above-referenced U.S. Pat. 5,115,120. These springs are offset from each other in blocks 92 and 94 which are distributed along the pivotal axis of the engine indicated at 96 so as to provide as many conductive paths through the flexures as are needed to connect the integrated circuits and the driving means (the coils) of the scan engine to terminals of the scan engine, and also to provide operating power to laser diode 44 from such terminals. Blocks 92 and 94 may be molded of plates conductive plastic material to provide conductive paths from the flexures to the circuit board 62.

FIGS. 8 to 23 illustrate different embodiments of electro-optical receptors and particularly the light collectors thereof which may be used in the terminal shown in FIG. 1, but are generally applicable for use in scan engines and even more generally in electro-optical receptors, particularly where space is at a premium and miniaturization is desired. These collectors facilitate miniaturization by shortening optical propagation paths and having these paths self-contained in their bodies (which may be considered optically transmissive substrates). Generally, the collectors are optical elements or optics which through the use of gratings, lenses (particularly Fresnel lenses) and/or mirrors and fold the light at least once, but preferably a few (e.g. three or four) times within the body of the collector. The light is with a reasonable degree of efficiency (for the minimization of leakage from the body), brought to a focus either at a spot or along a line which is preferably on a side end of the body, but may be along any surface spaced from the surface on which the light is incident. At this surface, a light coupling structure is defined which enters or introduces the incident light into the body where it is propagated with one or more folds to the side end or other surface where an optical electrical transducer (a photo detector) is optically coupled. This photo detector may be integral with the body or spaced therefrom. The latter arrangement is functionally more desirable when the collector is moveable, for example when it is part of a scanner assembly as is exemplified in FIG. 24 discussed in greater detail hereinafter.

In various embodiments of the light collectors, gratings are used. These may be surface relief gratings as shown which are provided by a surface engraving, optical replication or embossing or they may be photochemically etched. The grating or other element of the light coupling structure, for example, Fresnel lenses in some embodiments, may be assembled with the body or substrate. For example, the gratings may be formed holographically using conventional photochemical techniques and materials such as dichromated gelatin. All such coupling structures should be deemed as being defined by the surface of the body on which the light is incident for collection, whether they are separately made and assembled with the body or made directly on the surface of the body designed to receive the light for collection. Where a grating profile is shown as being the surface profile of a surface of the body it will be understood that that profile may be formed by any of the techniques discussed above by way of example.

The photodetectors are not illustrated in the drawing in several embodiments. This is for purposes of simplifying the illustration. Photodetectors are utilized and they may be line arrays and charge coupled devices, especially where a line focus is obtained, or photodiodes or photo-transistors where a spot or point focus is obtained.

Figure 8:
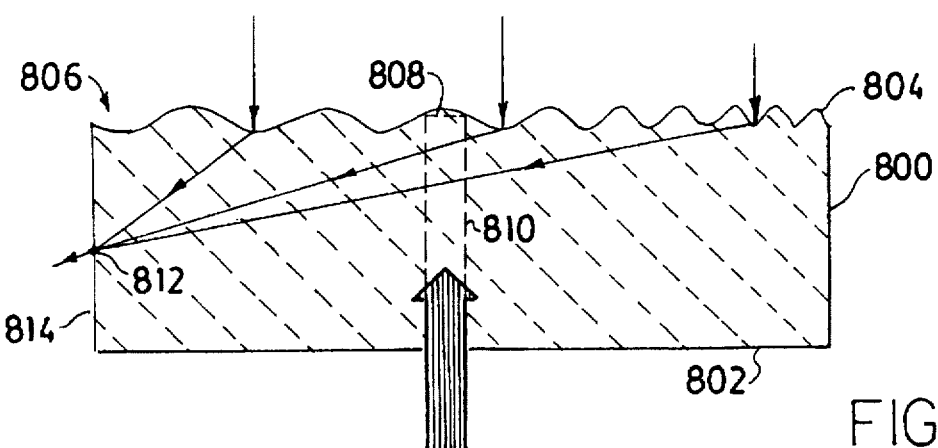

Referring to FIG. 8, there is shown a cross-section through a generally rectangular plate of optically transmissive material such as glass or optical plastic (e.g. polycarbonate) which has an opening therethrough for the laser beam which scans the bar code. Where the laser source is a laser diode, and particularly a surface mount laser diode, the diode and its heat sink may either be below the body or substrate 800, on its lower surface 802 (the surface opposite to the surface 804 on which the light is incident) or within the body. In any event the portion of the light coupling structure 806, shown as a variable pitch grating, has an area 808 thereof where the grating lines are removed and via which the beam passes. A hole 810 may be provided through the body if desired. The grating is a variable frequency or periodicity (the distance between the grating lines) grating where the periodicity decreases away from the focus. The periodicity is sometimes called the grating frequency. Then the grating frequency increases along the length of the body 800 in a direction away from the focus 812. The focus may be at the side end surface 814 or in the vicinity thereof, for example at the detector if mounted on the surface 814 outside the body 800.

The design of grating lenses may follow known technology. The grating lenses may be made of accurate segments in which case the focus is the center or radius of each arc. Generally the design uses the classic Fresnel formula, r= $\sqrt{2m\lambda_0 f}$, where r is the distance to the line, and m is the number of the line, λ0 is the design wavelength, and f is the focal length. Reference may be had to U.S. Pat. 5,013,133 issued May 7, 1991 to D. A. Buralli and G. M. Morris, entitled "Diffractive Optical Imaging Lens System", and to the patents and literature cited and discussed therein, for further information as to the design of diffractive grating lenses (sometimes called kineform lenses).

Figure 9:
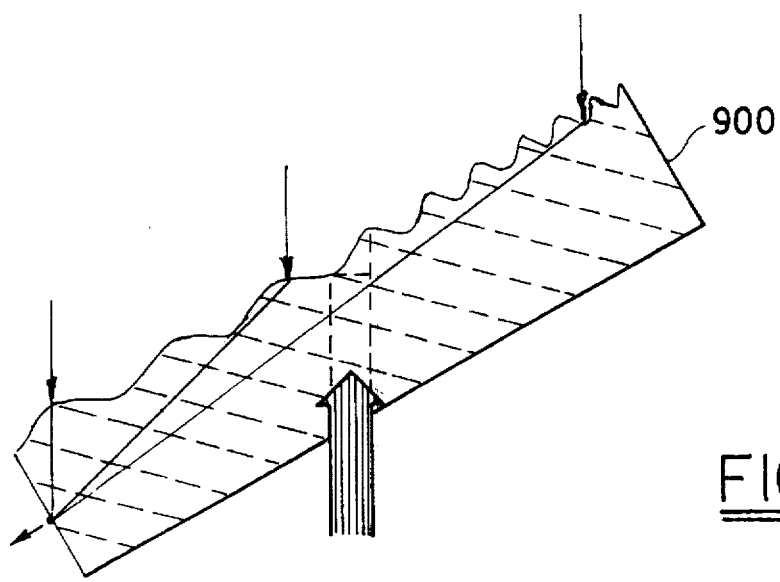

The coupler 900 shown in FIG. 9 is identical to the coupler shown in FIG. 8. The grating pitch is adjusted across the input aperture (the aperture defined by the surface on which the light is incident) which may be the aperture of the coupler itself or an external physical aperture. The coupler 900 is tilted to effectively adjust the grating pitch or periodicity across the aperture. Tilting decreases the grating frequency (and the profile changes); and can break the degeneracy thus reducing the negative order and enhancing the first order diffraction which is shown in the drawings. This increases the efficiency of the grating and therefore of the coupler 900. The tilt may be varied to meet different applications by mounting the coupler body in a structure which enables it to tilt about an axis through or parallel to the focus.

Figure 10:
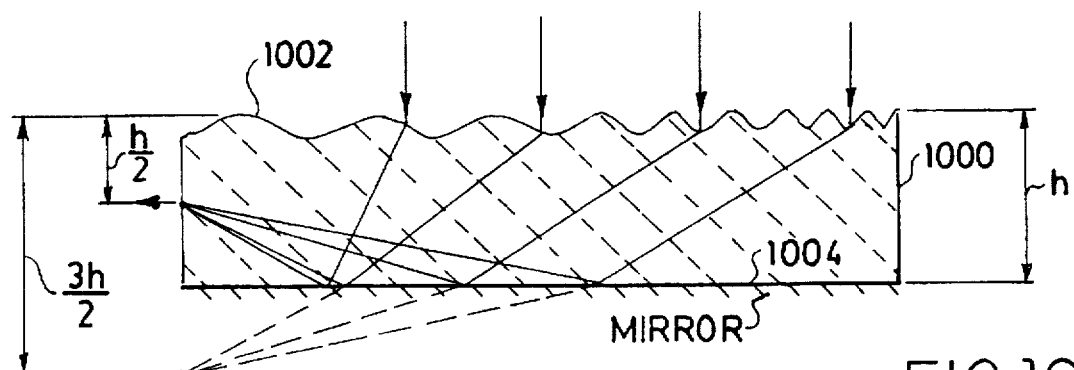

Referring to FIG. 10 there is shown a body 1000 of transmissive material such as discussed above in the case of the body 800. A variable frequency grating 1002 provides the light coupling structure. The opposite face 1004 is reflective and may be a mirror coating on the outside of the face 1004. The hole or other means via which the laser beam passes through the body 1000 is not shown in FIG. 10 or any of the other FIGS. in this group (FIGS. 8 to 23) to simplify the illustrations. The use of the reflective surface 1004 effectively increases the thickness of the body, thereby enabling reduction of grating pitch (see the above formula) which eases fabrication. The F number of the optic is also reduced. There are two folds of the light within the body which propagates to the focus. The focal length is increased to 3/2h, where h is the thickness.

Figure 11:
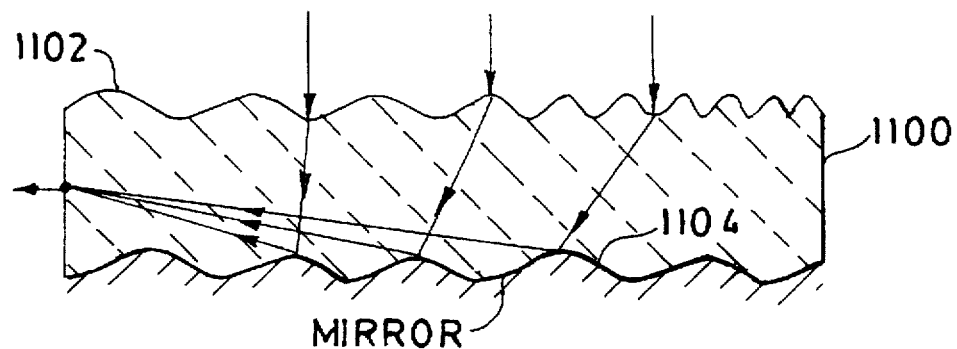
Figure 12:
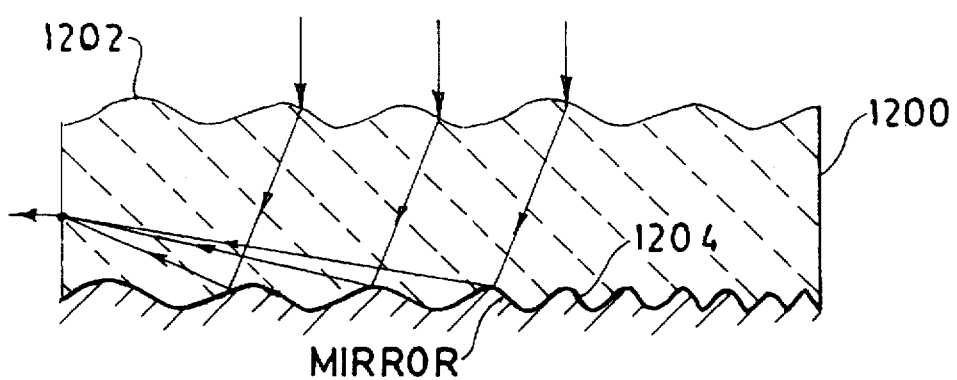

To still further reduce the grating pitch and increase the F number, combined gratings may be used, one on the surface on which the light from the symbol is incident and the other on the opposite surface as shown in FIGS. 11 and 12. The bodies 1100 and 1200 may be of material and of a shape such as discussed in connection with FIG. 8. In FIG. 11, the grating 1102 of the light coupling structure is a variable frequency grating while the reflective surface has a constant frequency grating 1104. In FIG. 12, the constant frequency grating 1202 is used in the coupling structure while the variable frequency grating 1204 is on the opposite face. Rays incident on the grating 1202 may be exactly parallel in the coupler of FIG. 12 which simplifies the design of the variable frequency grating 1204. The grating 1202 can be a blazed grating for high diffraction efficiency. Thus the FIG. 12 embodiment may be preferred.

In FIGS. 11 and 12, the focal length is the combined focal length of both lenses. The bottom grating diffracts the beam at a sharper angle than the upper grating thereby effectively reducing the focal length and reducing the F number. The mirror coating on the lower face is preferred for enhanced efficiency. However if it is desired to rely on diffraction to fold the light, the lower surface need not be reflective.

Figure 14:
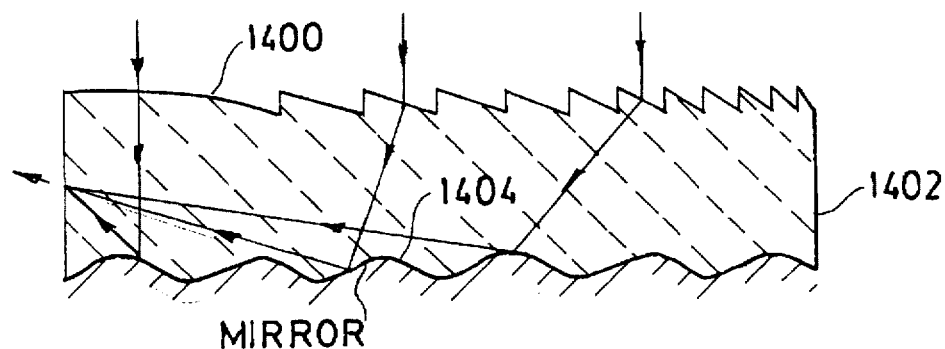

Refractive, instead of diffractive power may be used to provide a light coupling structure. FIG. 14 illustrates the use of refractive power in the form of a prismatic or Fresnel lens 1400 on a light transmissive body 1402. A reflective surface, and preferably a diffraction grating 1404 which may be constant or variable frequency, may be used to increase the focal length of the optic.

Figure 13:
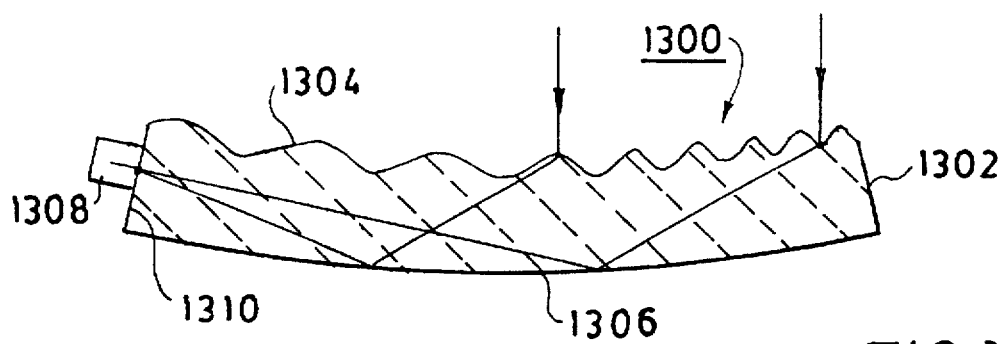

FIG. 13 shows a receptor 1300 having a rectangular body 1302 which is inwardly, concavely curved on both the face which provides the light coupling structure 1304 and the opposite face 1306. The photo detector, PD, 1308 is attached to the end face 1310 so as to be optically coupled to the light which is focused on the end face 1310 or in its immediate vicinity. The design of the FIG. 13 coupler is similar to that shown in FIG. 8. It will be appreciated that the design may be of the type shown in FIGS. 10 to 14 or may be in accordance with the other embodiments of the collectors shown and described herein.

Figure 19:
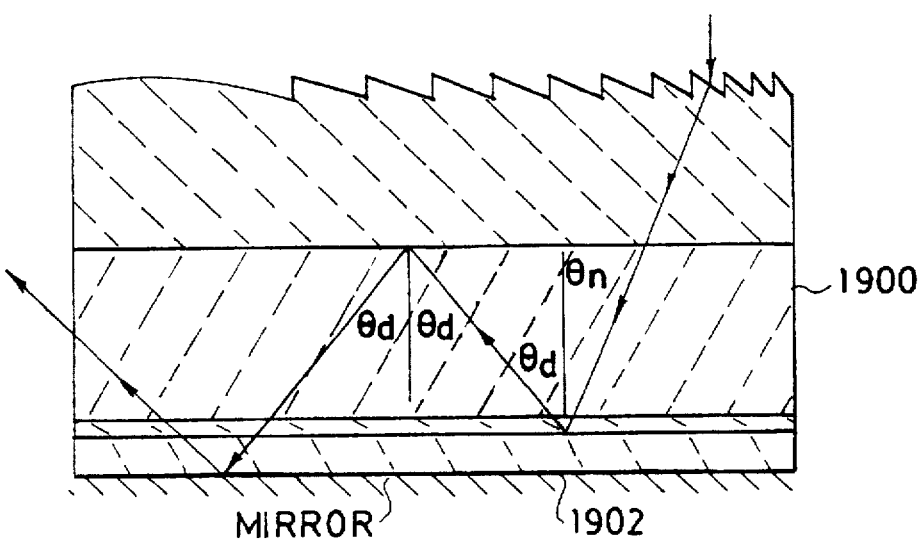
Figure 20:
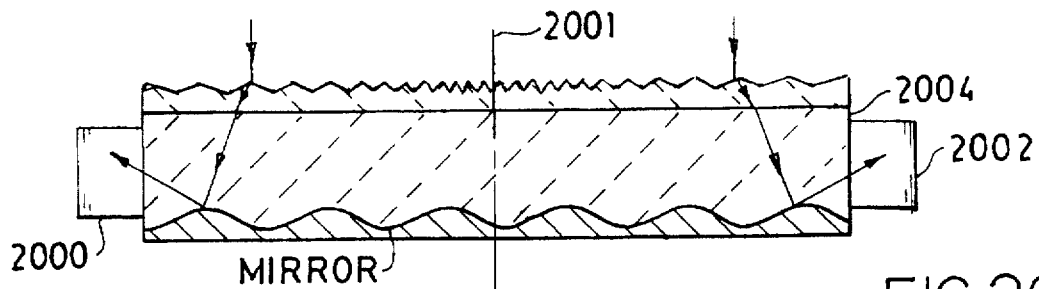
Figure 21:
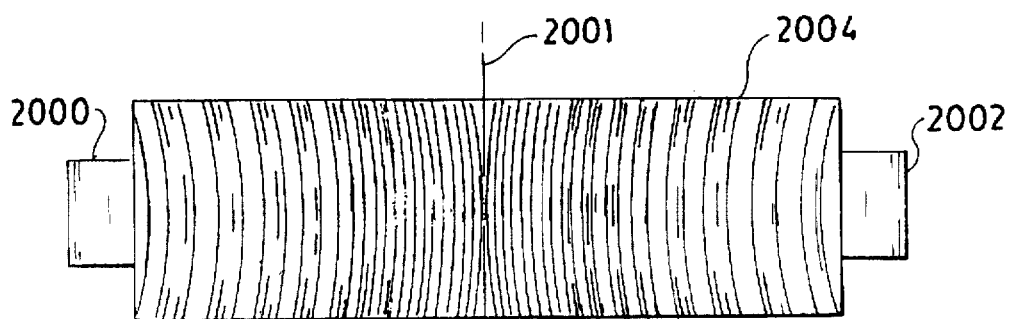

FIGS. 20 and 21 show different embodiments where the receptor is bifurcated into complimentary structures which may be mirror images of each other about a central plane 2,001. The receptors use a pair of photo detectors 2,000 and 2,002 on opposite side end faces. The light coupling structures may be any of the types discussed in FIGS. 8 through 14 or which will be discussed in connection with FIGS. 15 through 19. The coupling structures of each of the bifurcated parts may be of different design, for example, straight line gratings or curved gratings as shown. Preferably they are of the same design. The frequency increases in opposite directions with respect to the central plane 2,001 so as to provide focuses at the opposite ends of the coupler.

In the couplers described in connection with FIGS. 8 through 14 as well as in the other couplers which utilize light guide mode of propagation and are described in connection with FIGS. 15 through 19, only a few folds, usually three and sometimes only one, occur in the body of the coupler. Fewer folds are desirable for increasing the efficiency of the coupler. Fewer folds provides a higher probability that light reaches the photo detector. The greater the number of folds the more likely is leakage, scattering and absorption to occur of the light before it reaches the photo detector. Thus with one deflection as shown in FIGS. 10 through 14, efficiency is higher than with a larger number of deflections. Traditional, thin light guide designs provide lower efficiency of coupling (perhaps 10 to 20% efficiency) while the use of fewer folds and lower modes of propagation in the light guide increases efficiency. The body or plate may be made thicker and therefore physically more sturdy and rigid which is an additional advantage over traditional thin light guides and fibers. The thickness may typically be 1–5 mm.

FIG. 15 shows a body 1500 having a plurality of layers 1502, 1504 and 1506. The layers 1502 and 1506 have a lower refractive index than the layer 1504 which is sandwiched there between. The surface on which the light is incident may be lined or profiled to be diffractive or refractive and couples the light in so that the angle ($θ_d$ in case of diffraction) is sufficient for total internal reflection. The applicable relationship for total internal reflection is $$θ_d > \sin^{-1}\frac{n_1}{n_s},$$

where $n_1$ and $n_s$ are the indices of refraction of the layers 1502 and 1504. Where $n_1$ and $n_s$ are 1.55 and 1.66 the diffraction angle for total internal reflection is 65°, approximately.

It may be desirable to use a common layer 1504 (eliminate the layer 1506) and utilize a constant or variable frequency grating 1508, with a reflective surface 1510, as described in connection with FIGS. 11 and 12. Then the diffraction angle $\theta_d$ is the diffraction angle from the lower surface grating 1508. This last described embodiment utilizing the light guide mode of propagation in the collector is presently preferred.

Referring to FIGS. 16 and 17, there is shown a collector similar to that shown in FIG. 15 with a grating or Fresnel light coupling structure 1600 and a reflective grating 1602 on the face opposite to the face having the coupling structure 1600. Instead of reliance on an interface between two layers of different refractive index, a interface structure 1604 which may be a multi-layer coating is designed to have low reflectance (high transmittance) for low angles of incidence, but high reflectance for higher angles of incidence and FIG. 17 illustrates a plot of the reflectance characteristic, where $\theta$ is the incidence angle to the filter 1604.

The light couples into the structure and then is transmitted through the interface 1604 and diffracted from the grating 1602 such that $\theta_d$, which is the diffraction angle from the grating 1602, is above the angle for high reflectance from the interface 1604. The light then propagates to a side end of the light coupler where a photo detector is disposed.

Figure 18:
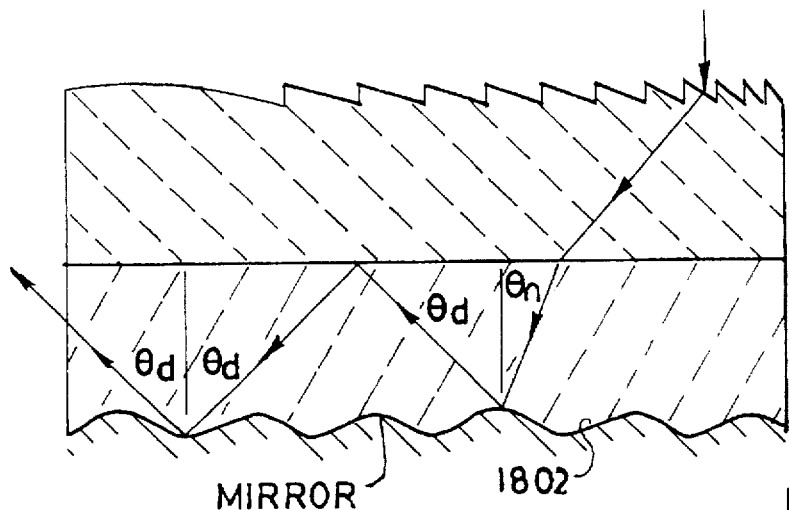

Referring to FIG. 18 there is shown an embodiment similar to FIG. 15 which utilizes a grating 1802 which is incidence angle dependent in grating efficiency. The grating efficiency decreases at angles greater than $\theta_d$ which is the diffraction angle. Thus, on the second bounce or fold, the light is deflected by specular reflection from the mirrored surface on the lower face of the coupler. Since specular reflection is an efficient process, the efficiency of the coupler may be greater than in the other light guide couplers described herein.

Referring to FIG. 19 there is shown a light guide embodiment similar to that shown in FIG. 18. A volume grating 1901 which may be a dichromated gelatine hologram (DGH) is sandwiched in the body between the light guide channel 1900 and a reflective surface 1902, which may be on a transmissive (glass) cover plate 1903 which sandwiches the DGH grating to provide the assembly forming the body 1900. The DGH has high diffraction efficiency at low angles of incidence (e.g., $\theta_n$ but substantially no diffraction efficiency at the diffraction angle $\theta_d$. Then reliance is placed on the reflective, mirrored surface 1902 to provide the third fold of the light which propagates through the light guide channel 1900. The dicromated gelatin hologram can be used in transmission as well. Then light incident at $\theta_n$ will be diffracted during transmission to $\theta_d$ and reflected at the mirror on the first fold.

Figure 22:
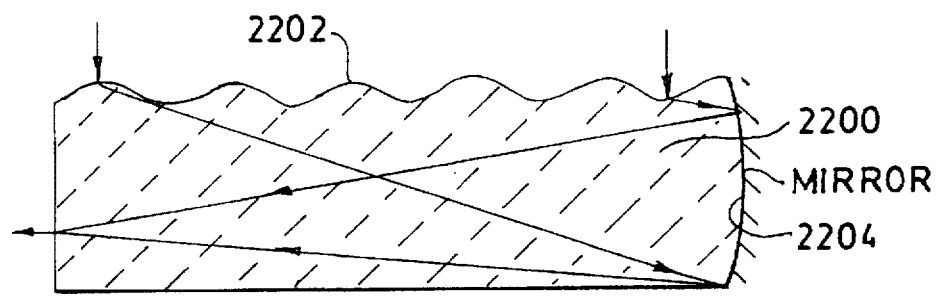
Figure 23:
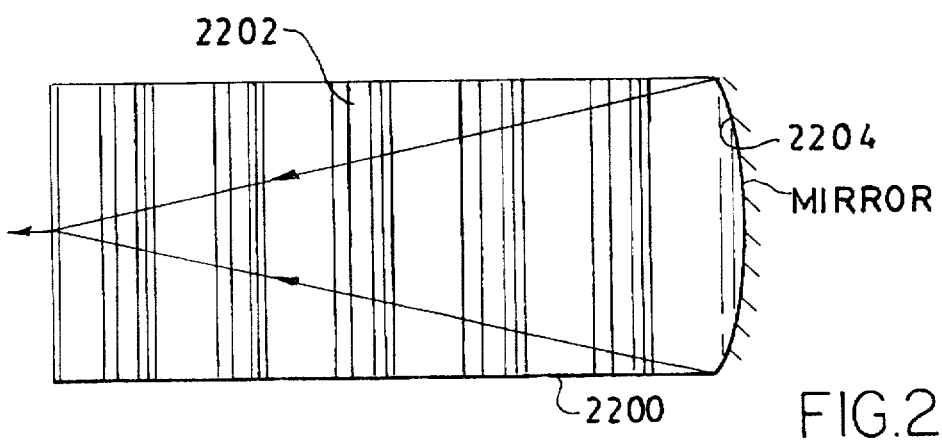

Referring to FIGS. 22 and 23, there is shown a coupler 2200 having a light coupling structure including linear grating lines 2202. A prismatic refractor may alternatively be used. This grating structure (which may be a constant or variable frequency grating) illuminates an end surface 2204. This surface is reflective and is curved so as to provide a mirror with power which focuses the light incident on the coupling structure surface to the focus at or in the vicinity of the end of the collector body opposite to the mirror surface 2204 preferably, the shape of the mirror surface 2204 is a cylindrical paraboloid. This mirror concentrates the light both vertically and laterally in the embodiment illustrated in FIGS. 22 and 23.

FIGS. 24, 25, 26 and 27 illustrate three different embodiments of scan engines incorporating an electro-optical receptor of the type shown in FIGS. 8 through 23. As discussed above in connection with FIGS. 1 through 7, it is also desirable to use a light collector of the type described in connection with FIGS. 8 to 23 in the flexural scan engine shown in FIGS. 1 to 7.

Figure 24:
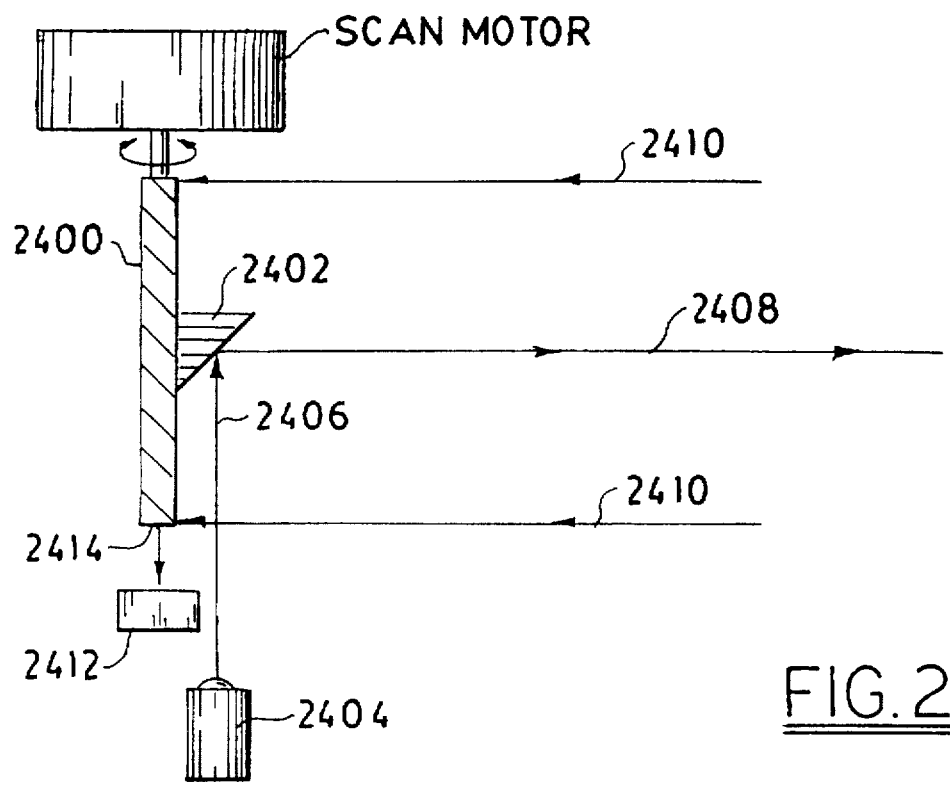

Referring to FIG. 24, there is shown a plate 2400 with gratings, mirrors, light guides, and etc., in accordance with any of the previously described embodiments. This plate is connected to a yoke (not shown). The plate also has attached thereto a facet mirror 2402 with its reflective surface at 45° to a light source provided by a laser diode assembly 2404. The laser diode generates a beam 2406 and directs the beam to the reflective surface of the facet where it is reflected out to the bar code. A motor is connected to the yoke, preferably so that its axis of rotation is aligned with the beam 2406 as it is projected to the facet 2402 from the laser diode. The axis may alternatively extend along the lengthwise direction of the body of the collector 2400. The collector and mirror assembly oscillates so that the collector surface, on which the light coupling structure is disposed, faces and scans the code conjointly with the scanning beam 2408 which is reflected from the mirror 2402. The return light from the code symbol is diagrammatically illustrated by the rays 2410 which are collected by the collector. A photo detector 2412 is preferably stationary and spaced from the side end 2414. The detector picks up the light without having to rotate and without requiring flexible leads, slip rings, or the like for the electrical signals which it generates and which correspond to the code which is scanned. The optic 2400 together with the facet mirror 2402 may be mounted on a flexal mount and driven by an electromagnetic driver as described in the above referenced U.S. Pat. Nos. 5,015,813 or 5,115,120 or on a flexural mirror mount of the type now commercially available.

Figure 25:
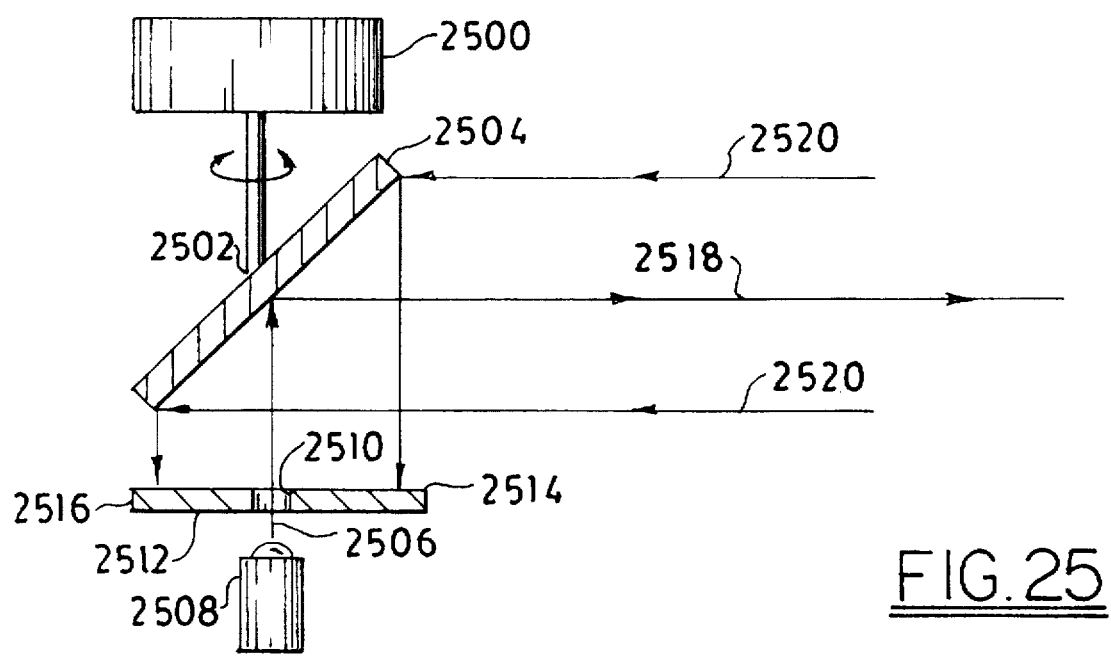

In FIG. 25, a motor 2500 is connected by way of its shaft 2502 which oscillates and drives a scan mirror 2504 having its reflective surface at 45° to a laser beam 2506 from a laser diode assembly 2508. The beam passes through a hole 2510 or other via in the collector 2512 of an electro-optic receptor 2514 which may be of the types described in connection with FIGS. 8 to 23. This receptor also includes a photo detector 2516 at an end thereof.

As the scan mirror oscillates, it projects a scanning beam 2518 toward the code and scans the bars of the code. The scanning illumination results in return light illustrated by the rays 2520 which are deflected by the scan mirror 2504 to the electro-optic receptor 2512 where they are translated into signals corresponding to the code. The receptor 2512 is stationary. The only moving part of the scan engine being the mirror 2504 and motor shaft. As above, this mirror may be mounted on a flexural mirror scanning mount as available commercially.

Figure 26:
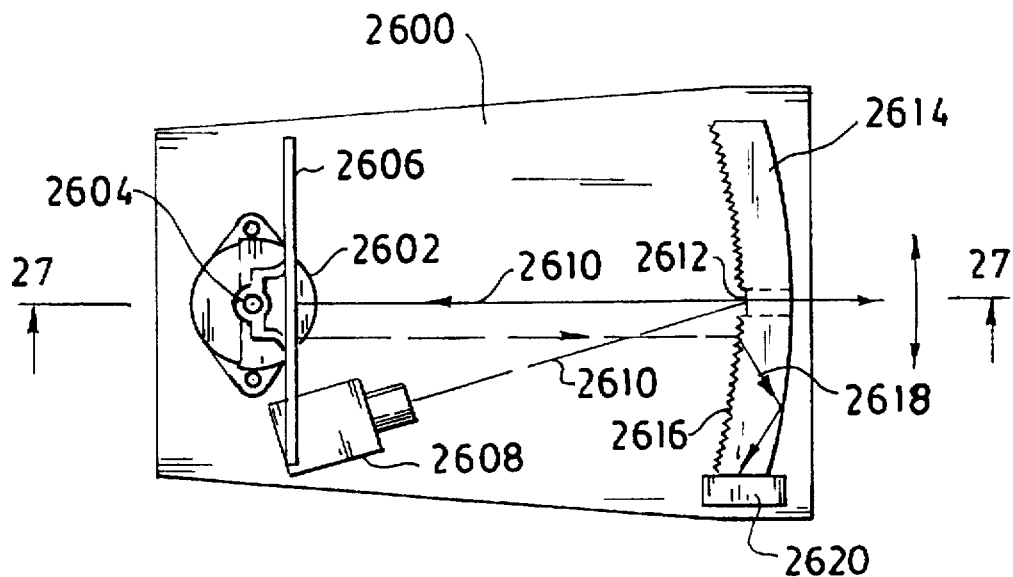
Figure 27:
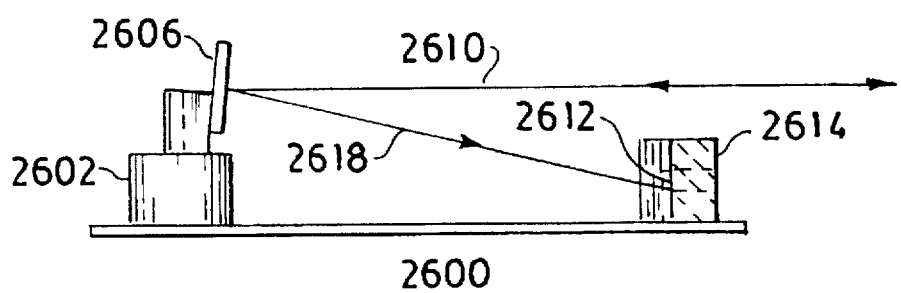

Referring to FIGS. 26 and 27, there is shown a scan engine which is generally of the type described in patent application Ser. No. 07/652,158 filed Feb. 7, 1991 in the name of J. M. Eastman et al. and assigned to the same assignee as this application now U.S. Pat. No. 5,200,597 issued Oct. 20, 1992. It has as its major components a printed circuit board 2600 on which the electronic components of this scan engine (not shown to simplify the illustration) may be mounted. Also mounted on the board is a scan motor 2602 which oscillates a shaft 2604 connected to a scanning mirror 2606. A laser diode assembly 2608 projects a beam 2610 to a reflective facet 2612 in the center of an electro-optical collector 2614. The collector has a light coupling structure 2616, such as a grating as described in connection with the preceding figures on a surface on which light from the code as it is scanned by the beam 2610 is incident. The surface having the coupling structure 2612 is concavely curved to facilitate light collection. The collected light is coupled into the structure and propagates as shown by the arrows 2618 to a photo detector 2620 at one end of the receptor 2614. The use of the receptor 2614 provides simplification of the design and construction of scan engines which may be in substantial part of a design similar to that heretofore used.

Referring to FIGS. 28a and b 29a & b, there is shown a scan engine for scanning and reading a two-dimensional (2-D) bar code. Some such bar codes (i.e. stacked codes) may have bars oriented along one dimension (columns) and codes consisting of the sequences of adjacent bars oriented along a perpendicular direction (rows). Other embodiments of 2-D codes may consist of a checker board like pattern of light and dark elements. Such a code is shown at 2800. The scan engine utilizes a laser and anomorphic optics for generating a fan beam of width which does not exceed the width of each line of code. This beam is scanned from line to line across the code in one of the dimensions. Scanning is provided by a scanning assembly including a scan motor and a mirror which is part of the imaging optics which provides the line beam at the code (in the plane of the code). Other beam scanning means such as electro-optic or acousto-optic deflectors may be used.

Figure 29B:
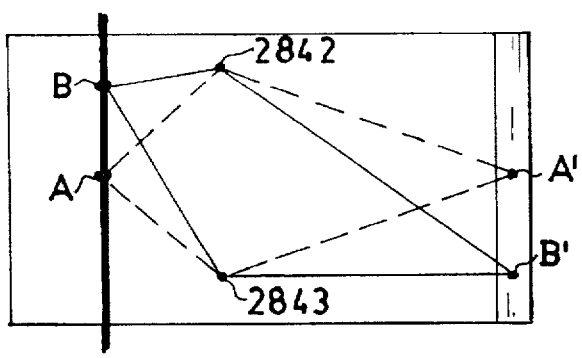

In order to read the beam, a detection system is provided which effectively scans the code in a dimension perpendicular to the line. This scanning system includes a substrate mode imaging system, which images the illumination line onto a linear charged coupled device or other line scan camera, as illustrated in FIGS. 29a and 29b. The camera translates each line of code into adjacent pixels. These adjacent pixels represent the code and provide digital information corresponding to each line of code from which the information in the code can be decoded by techniques known in the art. The scanning in both dimensions is synchronized. Preferably an optical encoder connected to the shaft of the scan engine provides synchronization signals which synchronize the CCD so that the pixels are generated line by line as the fan beam scans the code.

FIG. 29a illustrates a side view of 2-D bar code 2800, electro-optic receptor 2810 and line illumination 2820. Points A and B indicate representative elements of the 2-D bar code 2800 illuminated by line illumination 2820. Light scattered from points A and B is collected by receptor 2810. Two representative rays from A and B are shown, 2838 and 2839 from point A and 2840 and 2841 from point B. Rays 2838 and 2841 intersect the receptor at point 2842. Rays 2839 and 2840 intersect the receptor at point 2843. Rays 2838 and 2839 are imaged to point A' by the diffractive and refractive power in receptor 2810. Similarly, rays 2840 and 2841 are imaged to B'. The receptor 2810 may be of a design shown in FIGS. 8–23 but the light originating from separate bar-code elements along the line of illumination is imaged to distinct points at the edge of the collector as shown in FIG. 29b where the CCD 2845 may be located.

Preferably, the CCD is a linear array which is the detector of an electro-optical receptor of the type described in connection with FIGS. 8 to 23 above but a receptor which provides resolution along the illumination line 2820. Accordingly, the CCD can readily translate the light into adjacent pixels corresponding to the code.

From the foregoing description it will be apparent that there has been provided improved scan engines which may be fabricated in miniature form, and improved light receptors especially useful therein. The invention also provides a scanning accessory useful in providing integrated portable terminal with separable data collection and scanning units which may be used individually or assembled to form the integrated terminal. Variations and modifications in the herein described scan engines, receptors, collectors and integrated terminal, within the scope of the invention, will undoubtedly suggest themselves to those skilled in the art. Accordingly, the foregoing description should be taken as illustrative and not in a limiting sense.

We claim:

1. A scanning accessory for a portable terminal for collecting and entering data which comprises:

a first housing having a surface defining a receptacle and also defining a hollow body, said hollow body having a generally tubular surface, said generally tubular surface defining a manually seizable grip portion, said generally tubular surface also defining a window;

a miniature scan engine module having means for projecting a light beam outwardly from said module toward a data representing symbol, said scan engine being disposed in said grip portion with the beam projecting through said window toward said symbol;

an electro-optical receptor in said grip portion for collecting and concentrating therein light from said symbol in response to illumination by said beam and for providing electrical signals representing said symbol;

means in said grip portion for operating said scan engine; and means in said receptacle for releasably holding a second housing containing said terminal which comprises a portable data entry terminal having a keyboard for manual data entry, said receptacle having means for holding said first housing and second housing and said terminal and accessory in assembled and signal communication relationship for communicating said signals to said terminal.

2. The scanning accessory according to claim 1 further comprising a flexible cable extending from said first housing, and means in said hollow body for carrying said signals representing said symbol.

3. The scanning accessory according to claim 2 wherein said first housing containing said scan engine module has means enabling operation independently from said portable terminal.

4. The scanning accessory according to claim 3 wherein said first housing contains manually actuable means to initiate scanning of said data representing symbol by said scan engine module and means to terminate scanning when the data representing symbol has been decoded or when a period of time has elapsed.

5. The scanning accessory according to claim 1 wherein said electro optical receptor comprises an optical collector comprising a body having a first surface exposed to light from the symbol and a second surface spaced from said first surface, a light coupling structure along said first surface substantially over said first surface in its entirety for entering the light from the symbol into said body via said first surface for propagation in said body to said second surface, said receptor further comprising an opto-electric transducer in light receiving relationship with said second surface responsive to light reaching said transducer via said second surface into said and translating electrical signals representing said symbol.

6. The scanning accessory according to claim 5 wherein means, including said light coupling structure, are provided for folding said light at least once in said body so that it is confined in said body and propagates to said second surface.

7. The scanning accessory according to claim 6 wherein said means for folding said light is operative to fold said light a plurality of times in said body.

8. The scanning accessory according to claim 7 wherein said means for folding said light is selected from the group consisting of a diffraction grating, a mirror, a mirror backed diffraction grating, a mirror having focusing power, a mirror backed diffractive lens, an interface between layers in said body of different refractive index which defines an optical light guide, and an element in the path of light propagation presenting a surface having a reflectivity dependent on the angle of incidence of the light therewith.

9. The scanning accessory according to claim 7 wherein said body has a thickness between surfaces thereof along which the light propagates to support a mode of propagation having less than 4 folds.

10. The scanning accessory according to claim 9 wherein said thickness is approximately 1 mm or greater.

11. The scanning accessory according to claim 6 wherein said light coupling structure is selected from the group consisting of a diffraction grating, a diffractive lens and a Fresnel refractive lens.

12. The scanning accessory according to claim 6 wherein said light coupling structure is a diffraction grating on said first surface, said body having an edge which is an edge of said second surface and said grating having lines which extend in a direction generally along said edge.

13. The scanning accessory according to claim 12 wherein said grating is a diffractive lens, said lines have a periodicity which increases in a direction away from said second surface to provide a focus for a given diffractive order at or adjacent to said second surface.

14. The scanning accessory according to claim 13 wherein said lines have an arcuate curvature and said focus is a spot.

15. The scanning accessory according to claim 12 wherein said lines are defined by a certain profile and said collector receives light incident on said first surface from a given direction, and said first surface is tilted with respect to said given direction to change the effective periodicity and profile of said grating to increase the periodicity of the grating lines and the profile thereby reducing degeneracy of incidence in a direction normal to said first surface.

16. The scanning accessory according to claim 5 wherein said body defines an optical light guide which guides light toward said second surface.

17. The scanning accessory according to claim 16 where said light coupling structure is defined by said first surface.

18. The scanning accessory according to claim 16 wherein said light guide is defined along one side thereof by layers of relatively higher and relatively lower index of refraction respectively further and nearer to said first surface.

19. The scanning accessory according to claim 18 wherein said light guide is defined along a second side thereof spaced from said one side by a mirror surface.

20. The scanning accessory according to claim 19 wherein said light guide is defined by a grating along said one side thereof inwardly of said mirror surface.

21. The scanning accessory according to claim 16 wherein said light guide is defined along one side thereof by means in said body extending in the same direction as said first surface which is transmissive and reflective for light incident thereon at lower and higher angles of incidence, respectively, and means defining said light guide along a side thereof opposite to said one side for deflecting said light towards said one side of said guide so that it is incident at said higher angles of incidence on said means which is transmissive and reflective.

22. The scanning accessory according to claim 16 wherein said light guide is defined by a mirror surface alone said second surface, and includes a grating along said second surface spaced inwardly of said mirror surface, and wherein said mirror surface is spaced from said grating by a light transmissive layer having said mirror surface thereon.

23. The scanning accessory according to claim 16 wherein said light guide has opposite sides, a first of which is spaced closer and the second of which is spaced further from said first surface on which said light from said symbol is incident, said second side having a surface providing specular reflection, and a grating along said second side, which deflects the light at a given diffraction angle towards said first side, the efficiency of diffraction of which decreases with increasing incidence angles thereby increasing the amount of light deflected from said second side into said light guide by specular reflection while decreasing the amount of light deflected from said second side into said light guide by diffraction.

24. The scanning accessory according to claim 5 wherein said coupling structure is a diffraction grating.

25. The scanning accessory according to claim 24 wherein said grating defines a diffractive lens.

26. The scanning accessory according to claim 5 wherein said coupling structure is a Fresnel refractive lens.

27. The scanning accessory according to claim 5 wherein said body is a plate and said first and second surfaces are different surfaces of said plate and the longest dimension across the surfaces of said plate is approximately one inch.

28. The scanning accessory according to claim 27 wherein first and second surfaces are a face and a side of said plate.

29. The scanning accessory according to claim 28 wherein said plate has a second side opposite to the side thereof which defines said second surface, said second side defining a mirror having curvature and which focuses the light coupled into said body at or in the vicinity of said second surface.

30. The scanning accessory according to claim 27 wherein said plate has a length and a width and said side is an end of said plate along the width thereof.

31. The scanning accessory according to claim 30 wherein said light coupling structure is defined by and covering substantially entirely said face which is a first face of said plate and said plate has a second face opposite to said first face, and said second face being reflective inwardly of said plate.

32. The scanning accessory according to claim 31 wherein said second face is a planar and defines a planar reflective surface.

33. The scanning accessory according to claim 31 wherein said second face defines a grating.

34. The scanning accessory according to claim 33 wherein said light coupling structure defined by said first face is a grating.

35. The scanning accessory according to claim 34 wherein said grating defined by said first face is a constant periodicity grating and said grating defined by said second face is a variable periodicity grating with said grating on said first face, which defines a focus for said light at or in the vicinity of said second surface.

36. The scanning accessory according to claim 34 wherein said grating defined by said second face is a constant periodicity grating and the grating on said first face is a variable periodicity grating which with the grating on said first face defines a focus for said light at or in the vicinity of said second surface.

37. The scanning accessory according to claim 30 wherein said plate is curved.

38. The scanning accessory according to claim 30 wherein said plate has opposite ends, and said light coupling structure being bifurcated to propagate the light in said body towards both of said opposite ends, and opto-electric transducers in light receiving relationship with said ends.

39. The scanning accessory according to claim 38 wherein each said light coupling structure is a mirror image of the other about a plane perpendicular to said first surface.

40. The scanning accessory according to claim 38 wherein said bifurcated light coupling structure has means associated with and disposed along surfaces of said body for propagating the light to said ends, said bifurcated structure and its said associated means being selected from the group consisting of gratings, Fresnel refractive lenses, mirrors and optical light guides.

41. The scanning accessory according to claim 1 wherein said scan engine comprises a first support, a light source included in said light beam projecting means mounted on said first support, said electro-optical receptor also being mounted on said first support with said first surface facing in the same direction as said beam, a second support attached to said hollow body, flexure means connecting said first support to said second support and defining a pivotal axis, and drive means on said supports for reciprocating said first support with respect to said second support about said pivotal axis to scan said beam and said receptor.

42. The scanning accessory according to claim 41 wherein said second support comprises a base and said first support comprises a printed circuit board, said drive means being an electromagnetic drive having an armature on said board and a stator on said base said armature and stator being electromagnetically coupled to each other.

43. The scanning accessory according to claim 41 wherein said first support comprises a printed circuit board having conductors thereon connected to said drive means, a photodetector responsive to light collected by said receptor, said photodetector and said source being disposed in mounted relationship with said board and being pivotable therewith, and said flexure means having conductors connected to said board conductors, and terminals on said base connected to said flexure means conductors.

44. The scanning accessory according to claim 43 wherein said source is a semiconductor laser device in a barrel attached to said first support, and said receptor having a grating and a light guide, an optically transmissive nondiffractive portion in said light guide and grating which either contains said barrel or through which said beam passes.

45. The scanning accessory according to claim 1 wherein said first housing has a manually actuable trigger switch extending outwardly therefrom and connected to said operating means.

46. The scanning accessory according to claim 1 further comprising a beam folding mirror disposed in said housing tilted with respect to said beam and facing said window for deflecting said beam outwardly from said first housing through said window and deflecting light from said symbol in response to illumination said symbol by said beam in a direction opposite to the direction in which said beam is directed.

47. The scanning accessory according to claim 1 wherein said first housing has a closed top, a front, a rear and a bottom, said receptacle being disposed at the top of said first housing, said window being disposed in said front adjacent to and below said top and above said surface defining said handle.

48. A scanning accessory comprising:
 a first housing having a hollow body, said hollow body having a generally tubular surface defining a manually seizable grip portion;
 a miniature scan engine to project a light beam outwardly from said scan engine toward a data representing symbol, said scan engine being disposed in said grip portion with the beam projecting through a window toward said data representing symbol; and
 a receptor for receiving light from said data representing symbol in response to illumination by said beam and for providing signals representing said symbol, said receptor being disposed in said grip portion.

49. A scanning accessory as recited in claim 48, further comprising means in said handle for operating said scan engine.

50. A scanning accessory as recited in claim 48, wherein said first housing further comprises a surface defining a receptacle; said receptacle having means for releasably holding a second housing.

51. A scanning accessory as recited in claim 50, wherein:
 said second housing contains a terminal which comprises a portable data entry terminal having a keyboard for manual data entry;
 said receptacle has means for holding said first housing and second housing in an assembled relationship; and
 said receptacle has a connector for coupling said terminal and said scanning accessory in a signal communication relationship for communicating said signals representing said symbol to said terminal.

* * * * *